United States Patent
Phillips et al.

[15] 3,692,023

[45] Sept. 19, 1972

[54] FORMABLE ORTHOPEDIC CAST MATERIALS, RESULTANT CASTS AND METHOD

[72] Inventors: Benjamin Phillips, Riverside, Conn.; Dale Flavian Pollart; Joseph Victor Koleske, both of Charleston, W. Va.

[73] Assignee: Union Carbide Corporation, New York, N.Y.

[22] Filed: July 20, 1970

[21] Appl. No.: 56,727

[52] U.S. Cl. .................................................. 128/90
[51] Int. Cl. .............................................. A61f 05/04
[58] Field of Search ............... 260/78.3, 874; 128/90

[56] References Cited

UNITED STATES PATENTS

| | | | |
|---|---|---|---|
| 2,385,879 | 10/1945 | Patton .................. | 128/90 UX |
| 2,853,067 | 9/1958 | Puharich .................. | 128/90 |
| 3,021,310 | 2/1962 | Cox et al. .................. | 260/78.3 |
| 3,371,077 | 2/1968 | Calfee .................. | 260/874 |
| 2,616,418 | 11/1952 | Eberl .................. | 128/90 |
| 2,800,129 | 7/1957 | Swaay .................. | 128/90 |
| 3,490,444 | 1/1970 | Larson .................. | 128/90 |
| 3,169,945 | 2/1965 | Hostettler et al. .......... | 260/78.3 |
| 3,294,743 | 12/1966 | Mack .................. | 260/78.3 |
| 3,324,070 | 6/1967 | Hostettler et al. ...... | 260/874 X |
| 3,408,421 | 10/1968 | Kurka .................. | 260/78.3 X |

OTHER PUBLICATIONS

Herschell, W. et al. Plastic Splints and Appliances in Orthopedic Surgery, Journal of Bone and Joint Surgery. 30B:298 (5-1948) pg. 298 cited

*Primary Examiner*—Samuel Koren
*Assistant Examiner*—George M. Yahwak
*Attorney*—Paul A. Rose, John F. Hohmann, William Raymond Moran and Charles J. Metz

[57] ABSTRACT

Orthopedic casts for humans and animals are prepared from orthopedic cast materials in the form of webs or sheets containing cyclic ester polymers or blends of cyclic ester polymers and poly(vinyl alkyl ether). The preferred cyclic ester is poly-epsilon-caprolactone, and the preferred poly-(vinyl alkyl ether) is poly(vinyl ethyl ether). The webs of cyclic ester polymer or blend can be heat fused or bonded to, embedded with, or impregnated into backing webs such as gauze, fabric, plastic film and the like. The cyclic ester polymer or blend can be dusted onto webs like gauze and heated to fuse it to the gauze to form a moisture-vapor permeable orthopedic cast material. The same can be obtained by impregnating the gauze with a solution of the cyclic ester polymer or blend, and driving off the solvent. Typically, the orthopedic cast material can be wrapped around a broken limb, heated, molded, and cooled to form a relatively rigid cast. Heating can be applied before or after the cast material is applied to the body portion. The cast is easily removed by heating it and, if necessary, manually manipulating it away from the body portion.

37 Claims, No Drawings

FORMABLE ORTHOPEDIC CAST MATERIALS, RESULTANT CASTS AND METHOD

BACKGROUND OF THE INVENTION

1. Field of Invention

This invention relates to thermoplastic cast forming material in the form of a bandage, web, film, tape or sheet, and methods useful in the treatment of the human and animal body for the maintenance of immobilization and fixation following reduction of fractures and dislocations, the maintenance of approximation of bone fragments following reduction of fractures, the maintenance of fixation and immobilization to promote healing in instances of compound fractures and bone disease, the immobilization of inflamed or injured joints in disease or trauma, and the support and immobilization of ligamentous and muscular structures in instances of sprains and strains. The improved cast materials also may be used as an occulusive dressing for wounds of the extremities by encasing the limb or part to reduce motion and accelerate healing; as a support splint in paralysis or weakness of muscles; and as a means to maintain correction of deformities, either congenital or acquired. Hereinafter the term "sheet" is used to designate all of the forms of the cast material mentioned above, namely, film, tape, sheet, web and the like.

2. Description of the Prior Art

Heretofore, cast materials such as plaster of Paris have been extensively used by casts made from such materials are heavy, bulky, sensitive to water, relatively easily crushed, so that the splinting has to be repeated, is difficult to clean, is not soil-resistant, lacks transparency and has poor x-ray penetrability. Aluminum splints, lined with a soft polyether foam, have also been used but are difficult to fasten to fingers and toes. And may cause scratching.

The use of certain specific plastic materials in splints is known where, as in U.S. Pat. No. 2,616,418, specific crystalline non-polymeric, organic compounds having sharp melting points between 45°C. to 100°C. are admixed with specific high molecular weight thermoplastic substances, such as, cellulose acetate, to form cast-forming compositions. U.S. Pat. No. 2,385,879 discloses plastic cast material comprising a particular plasticizer and a conjoint polymer of a vinyl ester of an aliphatic acid and a vinyl halide. U.S. Pat. No. 3,420,231 discloses thermoplastic cast forming sheet material that is flexible and moldable at about 165°F. The sheet contains a fibrous substrate coated with a cast forming material comprising a specific elastomeric type resin, such as, a trans 1,4-chloroprene polymer and a specific inversely soluble resin, such as, methyl cellulose, hydroxy propyl methyl cellulose or polyvinyl methyl ether. Other types of cast materials and methods of making splints, braces and supports are disclosed in U.S. Pat. Nos. 336,740, 2,301,426, 2,483,715, 2,759,475, 2,800,129, 3,048,169, 3,286,693, 3,314,419, 3,326,211, 3,415,243, 3,442,265 and 3,467,086.

These prior materials and methods for forming splints, braces, supports or casts have met with little practical success because of one or more disadvantages attending their use. In some cases they are difficult to apply or mold and involve complicated heating and water treatments or other manipulating steps. In other cases, separation of components, such as plasticizers, from the splint, brace, support or cast containing same can cause discomfort and in some instances extreme irritation to the skin of the patient. In still other cases the splint, brace, support or cast is water sensitive, lacks sufficient strength or rigidity, is difficult to reliably fasten to the body portion being corrected and/or is difficult to remove when no longer needed.

SUMMARY OF THE INVENTION

This invention provides formable orthopedic casts and cast materials in the form of sheets, tapes, films and preformed contour fitting shapes for application to the human or animal body to form a splint, brace, support, protective shield or cast thereon. The term "cast" as used herein is intended to include splints, supports, braces, shields and other similar orthopedic devices. The casts and cast materials are made with a cyclic ester polymer which is more fully described hereinafter. The invention also provides methods for making such formable, orthopedic cast materials and for making such splints, braces, supports, shields and casts.

The cast materials of this invention are very easily and rapidly applied to the human or animal body to form rigid, non-irritating, strong, durable, water-resistant, soil resistant, close-fitting splints, braces, supports, shields and casts which are very easily removed no longer needed, without even the slightest injury or irritation to the patent and without serious damage to the cast material which may be sterilized and used again, if desired. There is not danger of skin irritants or other substances exuding from the cast material before or during application to the patient and the material can be made transparent and self-adhering, as desired.

Illustratively, the cast or cast material can be in the form of a web selected from the class consisting of:
  i. an unsupported web or sheet of the cyclic ester polymer;
  ii. an unsupported web or sheet of a blend of the cyclic ester polymer and a poly(vinyl alkyl ether);
  iii. a flexible base web or sheet, such as gauze, cotton flannel, Mylar film or other similar material coated or impregnated with or bonded to or embedded into the cyclic ester polymer thus forming a composite; and,
  iv. a flexible base web or sheet as described above coated or impregnated with or bonded to or embedded into a blend of cyclic ester polymer and poly(vinyl alkyl ether) thus forming a composite.

The webs of cyclic ester polymer or blend thereof in forms (i) and (ii) listed above can be of any desired thickness ranging from about 1 or two mils or less, such as in the case of tapes or films, up to about 500 mils or more, such as in the case of sheets or plates. The flexible base layer in forms (iii) and (iv) listed above can be of any desired thickness, such as, about 1 mil to about 50 mils and can comprise a non-porous film, e.g., Mylar film coated with the polymer or blend or a fabric, e.g., cotton gauze or cotton flannel, that has been impregnated with or embedded into the polymer or blend or that has been coated with a layer of the polymer or blend to form a laminate. The thickness of the resulting composite, i.e., forms (iii) and (iv) above can range from 1 to 2 mils or less up to about 500 mils or more.

The web or embedded, coated or impregnated base layer can be in the form of long thin strips or tapes which are wound several revolutions around the member to be immobilized or in the form of relatively thicker sheets which are wrapped around the member to be immobilized.

This invention also includes the methods for making the orthopedic cast material. Sheet or film extrusion, solvent casting or compression molding can be used in making forms (i) and (ii) above. A method for making forms (iii) and (iv) involves placing a web, sheet or film of cyclic ester polymer, or blend of cyclic ester polymer and poly-(vinyl alkyl ether), on a flexible, base web or sheet, and adhering the layer of the cyclic ester polymer or blend to the flexible base web by application of sufficient heat or pressure, or if desired, by means of a suitable adhesive. When a permeable base web such as fabric is used, it can be embedded into the sheet of cyclic ester polymer or blend to act as a reinforcing member by increasing the pressure under which they are pressed together, Another method involves heat-fusing together two layers of the cyclic ester polymer or blend together to form a laminated cast material. Other methods include impregnating a permeable base web, such as fabric, with a solution of the cyclic ester polymer or blend and drying the impregnated web, or dusting a base web with a powder of the cyclic ester polymer or blend followed by warming to fuse it to the base web.

This invention also includes the orthopedic cast material and the casts made therefrom.

The formable cast material of this invention can be used to make custom, contour fitting splints, braces and orthopedic or surgical supports. The resulting product can be used to form splints on broken or cracked limbs or other body parts, for injuries to tendons, ligaments, and the like, for correcting congenital malformations, such as clubfoot, hip-luxations, and the like, or for shielding and protective purposes for protecting teeth and other body parts. The product can be formed into units which cover only a portion of a limb or body part or into units that completely encompass the limb or body part. The splints or surgical support can be used on the human body or for veterinary purposes. The use of the formable cast material allows the elimination of things like aluminum splints and allows injured body parts such as finger joints and the like to be supported in bent positions. The term "orthopedic cast", as used herein, encompasses all of the above uses.

More specifically the formable cast material can be used to make cock-up splints, opponent splints, hand rest splints, full leg splints, cervical collars, heel protectors, writing aids, arthric cones, mouth pieces, tooth guards, arch supports, plantar molds, dynamic splints, and the like.

In use the orthopedic cast material is warmed to a sufficiently high temperature to cause the polymer therein to become soft enough to deform. The temperature is low enough to cause no added discomfort to the patient during application. The orthopedic cast material is molded to conform to the surface shape of the effected portion of the body and then is cooled to room temperature. Upon cooling (crystallizing) the orthopedic cast, which has been made to conform closely to the effected portion of the body to which it is applied, rigidifies. If desired, the orthopedic cast material can be heated before or after it is placed around or on the effected portion of the body.

The orthopedic cast is easily removed by warming it to a temperature at which it becomes soft enough to deform and then the heated orthopedic cast is manually deformed to permit removal from the body.

The casts made from the flexible cast material are rigid; easily and rapidly molded during application; strong; durable; not sensitive to water; stain resistant; close fitting to the surface of the body; not irritating to the skin; easily removed by heating (e.g., with hot air or water); translucent; customized; nontoxic and non-allergic; can be used over and over; can be washed with any detergent; is a non-conducter of heat, is easily cut with scissors or a knife when warm or cold, leaving a smooth edge. Because the cast can be custom made from sheets, films and the like, a number of sizes or designs of casts need not be stocked. Persons wearing the casts of this invention can go swimming, and engage in other activities without damage to the cast.

A unique property of cyclic ester polymers is their compatibility with a wide range of diverse materials thus permitting the blending of a medication into the cast material when it is formed.

DETAILED DESCRIPTION OF THE INVENTION

This invention encompasses the use of a cyclic ester polymer by itself or the use of blends of the cyclic ester polymer and a poly(vinyl alkyl ether). The especially preferred cyclic ester polymer is poly-epsilon-caprolactone and the especially preferred blend is a blend of poly-epsilon-caprolactone and poly(vinyl ethyl ether). The orthopedic cast material can contain up to about 90 percent, preferably up to about 80 percent, of poly(vinyl alkyl ether) and from about 10 percent, preferably about 20 percent, to about 100 percent of cyclic ester polymer, the percentages being based on the total weight of both polymers. When more than about 20 percent cyclic ester polymer is used, there is little if any tackiness and objects made from such blends do not adhere to themselves at ambient temperatures even when pressed together at such temperatures over extended periods, although they will adhere to themselves when pressed together at elevated temperatures. The presence of the cyclic ester polymer also has an advantageous effect on the creep resistance of casts and cast materials made therefrom. Poly-epsilon-caprolactone is especially preferred because it has a low melting point, is strong and tough, is light weight, is relatively inexpensive and has the ability to crystallize and harden at a reasonable rate at room temperature well within the times involved in applying the cast.

The cyclic ester polymers which are contemplated in the practice of the invention are those which possess a reduced viscosity value of at least about 0.3 to about 15, and higher. The preferred polymers of cyclic esters for many applications have a reduced viscosity value of from about 0.5 to about 10. These polymers are further characterized by the following recurring Unit I:

(I) 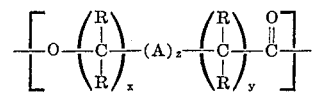

wherein each R, individually, is selected from the class consisting of hydrogen, alkyl, halo and alkoxy; A is the oxy group; x is an integer from 1 to 4; y is an integer from 1 to 4; z is an integer of zero or one; with the provisos that (a) the sum of $x + y + z$ is at least 4 and not greater than 7, and (b) the total number of R variables which are substituents other than hydrogen does not exceed 3, preferably does not exceed 2, per unit. Illustrative R variables include methyl, ethyl, isopropyl, n-butyl, sec-butyl, t-butyl, hexyl, chloro, bromo, iodo, methoxy, ethoxy, n-butoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed twenty.

In one embodiment, highly desirable cyclic ester polymers which are contemplated are characterized by both recurring structural Unit I supra and recurring structural Unit II:

(II) 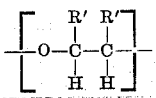

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having four to eight carbon atoms, desirably from five to six carbon atoms. It is preferred that recurring Unit II contains from two to 12 carbon atoms. Illustrative R' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The aforedescribed recurring linear Unit (I) is interconnected through the oxy group (—)—) of one unit with the carbonyl group

of a second unit. In different language, the interconnection of these units does not involve the direct bonding of two carbonyl groups, i.e.,

With relation to the relatively high molecular weight cyclic ester polymers, the terminal moieties thereof are not determinable by infra-red analysis which factor is readily understandable since macromolecules are involved. On the other hand, the relatively lower molecular weight cyclic ester polymers, e.g., those having reduced viscosity values below about 0.25 are characterized by end groups which can be hydroxyl; carboxyl; hydrocarbyl such as alkyl, cycloalkyl, aryl, aralkyl, and alkaryl; hydrocarbyloxy such as alkoxy, cycloalkoxy, aryloxy, aralkoxy, and alkaryloxy; and possible other moieties such as catalyst residue; and mixtures of the foregoing. It may be desirable in certain instances that the hydroxyl and carboxyl end groups, if present, be esterified or acylated to render them inert such as by reacting the hydroxyl moiety with a monocarboxyl compound or its corresponding anhydride, e.g., acetic acid, acetic anhydride, butyric acid, 2-ethyl-hexanoic acid, benzoic acid, etc., or by reacting the carboxyl moiety with a monohydroxyl compound such as a monohydric alcohol or monohydric phenol, e.g., methanol, 2-ethylhexanol, isobutanol, phenol, and the like.

When the cyclic ester polymers are prepared from a mixture containing the cyclic ester monomer and minor amounts of a cyclic ether which is copolymerizable therewith, e.g., alkylene oxide, oxetane, tetrahydrofuran, etc., the polymeric chain of the resulting copolymeric product will be characterized by both recurring linear Unit I supra as well as the recurring linear Unit II which would represent the alkylene oxide comonomer polymerized therewith. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group

of recurring linear Unit I supra or with the alkylene moiety of a second oxyalkylene Unit (II).

Particularly preferred polymers of cyclic esters are those which are characterized by the oxypentamethylenecarbonyl chain as seen in recurring structural Unit III:

(III) 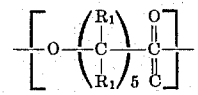

wherein each $R_1$ is hydrogen or lower alkyl, preferably hydrogen or methyl, with the proviso that no more than three $R_1$ variables are substituents other than hydrogen.

The preparation of the cyclic ester polymers are well documented in the patent literature as exemplified by U.S. Pat. Nos. 3,021,309 through 3,201,317; 3,169,945; 3,274,123; 3,305,605; 3,324,070 and 2,962,524 and Canadian Pat. No. 742,294. Briefly, the process involves the polymerization of an admixture containing at least one cyclic ester monomer with or without a functional (e.g., active hydrogen-containing) initiator therefor, and a suitable catalyst, the choice of which will depend on the presence or absence of added initiator.

Suitable monomeric cyclic esters which can be employed in the manufacture of the cyclic ester polymers are best illustrated by the following formula:

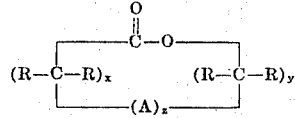

wherein the R, A, x, y and z variables have the significance noted in Unit I supra.

Representative monomeric cyclic esters which are contemplated include, for example, delta-valerolactone, epsilon-caprolactone; zeta-enantholactone; eta-caprylolactone; the monoalkyl-delta-valerolactone, e.g., the monomethyl-, monoethyl-, monohexyl-, delta-valerolactones, and the like; the dialkyl-delta-valerolactones; e.g., the dimethyl-, diethyl-, and di-n-octyl-delta-valerolactones, and the like; the monoalkyl-, dialkyl-, and tri-alkyl-epsilon-caprolactones, e.g., the monomethyl-, monoethyl-, monohexyl-, dimethyl-, diethyl-, di-n-propyl, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., the monomethoxy-, monoisopropoxy-, dimethoxy-, and diethoxy-delta-valerolactones and epsilon-caprolactones, and the like; 1,4-dioxane-2-one; dimethyl-1,4-dioxane-2-one; and the like. A single cyclic ester monomer or mixtures of such monomers may be employed.

In the absence of added functional initiator, the polymerization process is desirably effected under the operative conditions and in the presence of anionic catalysts as noted in U.S. Pat. Nos. 3,201,309 to 3,021,317 such as dialkylzinc, dialkylmagnesium, dialkylcadmium, trialkylaluminum, dialkylaluminum alkoxide, alkylaluminum dialkoxide, dialkylaluminum halide, aluminum trialkoxide, alkyllithium, and aryllithium. Specific anionic catalysts would include di-n-butylzinc, diethylmagnesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithium, n-butyllithium, phenyllithium and the like.

When employing an admixture containing cyclic ester monomer and functional initiator which possesses at least one active hydrogen substituent, e.g., amino, carboxyl, and hydroxyl, it is desirable to use the catalysts noted in U.S. Pat. Nos. 2,878,236, 2,890,208, 3,169,945, and 3,284,417 under the operative conditions discussed therein. In these processes the active hydrogen substituent on the initiator is capable of opening the monomer cyclic ester ring whereby said cyclic ester is added to said initiator as a substantially linear group thereto. The molecular weight of the resulting polymers of cyclic ester can be predetermined by controlling the molar ratios of cyclic ester monomer to be added to the functional initiator. Amino and hydroxyl substituents on the initiator will result in polymeric products having hydroxyl end-group. Carboxyl substituents on the initiator will result in polymeric products having carboxyl end-groups. The initiator with the active hydrogen atom will thus be contained in the final polymeric molecule. The esterification or acylation of the aforementioned end-groups has been described previously and is voluminuously documented in the art.

Polymers of cyclic esters can also be manufactured via the process described in U.S. Pat. No. 2,962,524. In this process, a monomeric admixture comprising cyclic ester and alkylene oxide which desirably has the formula:

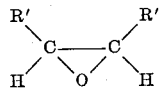

wherein each R', individually, have the meanings noted in Unit II supra, can be reacted with a monofunctional and/or polyfunctional (e.g., active hydrogen-containing) initiator possessing amino, hydroxyl and/or carboxyl groups, preferably in the presence of a Lewis acid catalyst such as boron trifluoride. Illustrative alkylene oxides would include ethylene oxide, propylene oxide, the butylene oxides, styrene oxide, epichlorohydrin, cyclohexene oxide, and the like.

Cyclic ester/alkylene oxide copolymers can also be prepared by reacting in the absence of an active hydrogen-containing initiator an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30°C.) of from about 0.3 to about 1.0), in the presence of an inert normally-liquid saturated aliphatic hydrocarbon vehicle such as heptane, phosphorus pentafluoride as the catalyst therefor, at an elevated temperature, e.g., about 80°C., and for a period of time sufficient to produce such cyclic ester/alkylene oxide copolymers.

The cyclic ester polymers employed herein contain in the polymeric chain greater than 50, preferably about 80, to about 100 mol percent of Unit I and about 0 to less than about 50, preferably about 20, mol percent of other units such as alkylene oxide Unit II, initiator residues or moieties, catalyst residues, and other difunctional and/or monofunctional units. The cyclic ester polymers containing about 100 mol percent of Unit I are preferred and those in which Unit I represents the oxypentamethylene carbonyl moiety are most preferred.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other organic solvent for the polymer may be used) at 30°C.

The poly(vinyl alkyl ether) which may be employed in the cast materials in this invention include poly(vinyl methyl ether), poly(vinyl ethyl ether), poly(vinyl isobutyl ether), poly(vinyl hexyl ether), poly(vinyl octyl ether) and the like and blends thereof. Preferably, such polymers contain no more than about eight carbon atoms in each alkyl group thereof and each polymeric molecule can contain the same or different alkyl groups. The vinyl alkyl ether monomers are prepared in any well known manner as by the catalytic reaction of acetylene with an alkanol which contains the desired alkyl group.

The cast materials can contain up to 25 percent by weight or more of a suitable filler, such as, magnesium or calcium carbonate, finely divided silica, clay, asbestos, alpha cellulose and the like uniformly dispersed in the cyclic ester polymer or blends thereof. The preferred size of the filler particles ranges from 3 to 4 microns. The cyclic ester polymers are compatible with a wide range of diverse materials and permit the dispersion therein of thixotropic agents such as particulate or fibrous asbestos or medication of the desired type for a variety of purposes, e.g., to soothe the skin and/or reduce bacterial or fungal activity. If increased bonding ability is desired at elevated temperatures, various types of tackifiers can be blended with the cyclic ester polymer.

The polymer of cyclic ester or the blend in the cast material of this invention can be in the form of an open or closed cell foam layer or it can be a solid, non-foamed layer, as desired.

Any suitable method of preparing the formable cast materials can be used. For example, the cyclic ester polymer can be fluxed on a two-roll mill or in a suitable mixer by heating to moderate temperatures, e.g., about 60°C. or more. If a blend is desired to be used, the poly(vinyl alkyl ether) can be added to the fluxing cyclic ester polymer and mixing continued until a substantially uniform blend has been obtained. Then, the cyclic ester polymer or blend is sheeted, extruded in the form of tape or film, or extruded and pelletized and compression molded into plaques, sheets, or other desired shapes, or otherwise shaped or formed into any desired configuration.

When the cast material contains a flexible base web or sheet as described above for forms (iii) and (iv), the tapes, films, sheets or plaques of cyclic ester polymer or blend can be overlaid the base web or sheet and warmed to about 60°C. and pressed together under sufficient pressure to bond them together. If desired a suitable adhesive can be used although it is not needed. When a porous or permeable base web or sheet is used it can be bonded to the cyclic ester polymer or blend such that the resulting composite comprises a substantially discrete layer of cyclic ester polymer or blend bonded to the base web or sheet which constitutes another substantially discrete layer by using a moderate pressure of the order of about 80 p.s.i. more or less. The porous or permeable base web or sheet can be embedded into the cyclic ester polymer or blend by increasing the pressure under which the two are pressed together and the embedded porous or permeable base web serves as a reinforcing member to provide added strength and rigidity.

In addition, powders or granules of the cyclic ester polymer and, if blends are desired, powders or granules of the cyclic ester polymer and poly(vinyl alkyl ether) can be dissolved in a common solvent, cast on a hard impermeable casting surface to form a sheet or film or spread on the flexible base or substrate and dried. Suitable solvents include benzene, toluene, 2-nitropropane, methylene chloride and other solvents. Methylene chloride and other fast drying solvents are preferred when the cyclic ester is applied as a solution to a casting surface or flexible base. Where blends are desired to be used, any method for bringing the two polymers into intimate contact can be used.

Another method of bonding the cyclic ester polymer or blend to the base web or sheet is to dust the base web or sheet with powdered or granulated cyclic ester polymer or blend followed by warming to temperatures at which the polymer or blend melt and coalesce on or in the surface of the base web to form a coating or impregnation.

The term "bonded to" or "bonding to" as used herein is intended, in its generic sense, to include coating the cyclic ester polymer on the base web, impregnating it into the base web, embedding the base web in it as well as bonding discrete layers of the base web and the cyclic ester polymer or web together.

Thus, the cyclic ester polymer or blend can be applied and bonded to the flexible base web in any convenient manner. As additional examples, a melt, solution or dispersion of the composition can be coated onto the flexible base by spraying, brushing, rolling, extrusion, or flowing techniques and allowed to dry and/or cool. Alternatively, the cyclic ester polymer or blend in film form or powder, granular or pellet form can be spread on the flexible base web by any of the above-mentioned techniques and heated, while being compressed onto the flexible base web, if desired, to soften or melt the composition, and then cooled to form a tough, strong bond between it and the flexible base web. The thickness of the layer, web or sheet of cyclic ester polymer or blend can be built up to any desired degree by repeating the above-described operations. No special treatments of the base web or sheet are necessary; their surfaces need only be reasonably clean and free of dirt, oil and other contaminants. The unique compatibility of the cyclic ester polymer and blends thereof with wide varieties of diverse substances greatly simplifies the bonding of same to a wide variety of diverse substrates or base webs. Temperatures as low as 60°C. to 80°C. are sufficient to bond the cyclic ester polymer or blend layer to itself or to adhere it to the flexible base.

The permeable or porous base web, when used, can be any fabric, for example, cellulosic fabrics (knitted, woven and nonwoven) such as flannel or gauze made of cotton; rayon; blends of cotton and rayon; blends of cotton or rayon with synthetic fibers, such as, poly(ethylene terephthalate) fibers, polyacrylonitrile fibers, nylon fibers and the like; and fabrics (knitted, woven or non-woven) and textile products made of wool fibers, nylon fibers; poly(ethylene terephthalate) fibers; polyacrylonitrile fibers and blends of two or more such fibers.

The impermeable or non-porous base web, when used can be formed from any polymer such as cellulose derivatives such as solid nitrocellulose, solid cellulose ethers, including ethyl cellulose, methyl cellulose, hydroxy ethyl cellulose, carboxy methyl cellulose, solid cellulose esters, such as cellulose acetate, cellulose decanoates and the like, polypeptides, nylons, thermoplastic polyurethanes, polyesters of polycarboxylic acids and polyhydric alcohols, preferably dicarboxylic acids and dihydric alcohols, the normally solid acrylic polymers and copolymers, such as, poly(methyl methacrylate), poly(ethyl methacrylate), poly(acrylonitrile) and those described on pages 133 to 138 of Modern Plastics Encyclopedia, 1964 and references cited therein; elastomers, such as natural rubber, and synthetic rubbers including butyl rubber, nitrile rubber, ploybutadiene rubber, polyisobutylene rubbers, acrylonitrile-butadiene-styrene rubbers, ethylene-propylene terpolymer rubbers, and silicone rubbers.

The flexible base web can be a layer of foam plastic, e.g. polyurethane foam, foam rubber or a layer of a natural sponge material.

The flexible base web, among other things, serves to assist in preventing the cyclic ester polymer or blend from adhering to the skin or hair which it covers when the cast is applied. In addition, when a porous or permeable base web is used and is not embedded in the cyclic ester polymer, it serves to permit air and moisture to permeate to and from the skin covered by it. When the flexible base web is contacted with the skin it is desirable that it be soft and comfortable such as flannel, terry or other pile fabric or gauze or other soft fabric. The fabric base layer can comprise two or more layers folded on each other as in cotton gauze bandages.

The base web can be a non-porous film such as Mylar film in which event it serves to prevent wrinkles, pleats and creases in the web of cyclic ester polymer or blend such as might occur when a strip of cast material made from it is placed in a pan of hot water for heating it.

If desired, the cyclic ester polymer or blend can be sandwiched between two flexible base webs or sheets of the same or different types by utilizing two sheets bonded to each face of the web of cyclic ester polymer or blend. For example, one face can be bonded to cotton flannel and the other face can be bonded to a plastic film such as Mylar film or both faces can be bonded to a plastic film or both faces can be bonded to a suitable fabric such as flannel. The procedures described above for bonding, coating, impregnating or embedding the base web and web of polymer or blend can be used also for applying the second base web to the exposed surface of cyclic ester polymer or blend. For example, the web of cyclic ester polymer or blend can be placed between two base webs and the resulting sandwich can be heated under pressure to bond the three webs together or, under higher pressures, to embed the two base webs in the polymer or blend web. Alternatively, if it is desired to embed one base web and not the other, the one base web is first embedded under heat and pressure and the second base web is bonded under heat and less pressure. In the sandwich composite, described above one or both of the base webs can be colored or carry a pattern for decorative effects and, if desired, a thin metallic coating such as aluminum can be applied to the exposed surface of the base web especially when it is a plastic film such as Mylar.

The cast material can be perforated to permit diffusion of air or moisture from and to the skin covered by the cast material after it is applied to the human or animal body. The size of such perforations is not narrowly critical and can range from about 1 mil to about three-fourths in. in diameter. The cast made from such formable cast material the series of holes or perforations promote evaporation of the perspiration moisture produced underneath the cast when it is in use on the human or animal body and which further reduces the weight of the already light cast.

The thickness of the cast material is not narrowly critical. The thickness of the supported or unsupported web of cyclic ester polymer or blend can vary from about 1 mil to about 500 mils, preferably 1 mil to 50 mils. The thickness of the supporting base web or sheet can vary from about 1 mil to about 500 mils, preferably about 1 mil to about 50 mils.

The web or sheet of flexible cast materials, not on a base, should have a thickness between about one-sixteenth inch and about one-fourth inch. Thicker sheets may be more difficult to bend in the many cases and thinner sheets may be too weak unless overlapped and may cool too quickly to fuse easily unless heat is applied after formation of the cast on the body portion. The exact thickness depends also upon the location of the body where the cast is to be applied. A thickness of one-sixteenth inch may be preferred for finger and toe casts, and a thickness of one-fourth inch may be preferred for larger limbs. Where greater strength and rigidity is desired webs or sheets thicker than one-fourth inch can be used. Also, for example, considerably greater thickness is desirable when the cast material is used in the formation of such devices as arch supports. Where great strength and rigidity is not of paramount importance and where overlapping is convenient webs or sheets considerably thinner than one-sixteenth inch can be used. The length and width of the cast material will vary according to its type and application, for example, a 10 × 10 inch sheet or 8 × 8 inch sheet has been found satisfactory for arm applications and a 10 × 30 inch sheet has been found satisfactory for leg applications.

To form many casts, e.g., those for fingers, toes, arms, legs, and the like, the cast material can be preformed into a tubular shape or other preformed shape. In other instances, the cast material in sheet form is molded around the body area and, if desired, is overlapped, is fused to itself by elevated temperature, and is held in place until it sets by cooling. The cast material can be heated by means of an ordinary home hair dryer, a specially designed heat gun or simply by immersing it in a pan of hot water drawn from an ordinary hot water tap. The cast material can also be used in the form of a tape or elongate sheet by successively wrapping it around the body part in an overlapping manner. Heat applied before or after wrapping causes the overlapping tape to bond together into a unitary cast which sets upon cooling.

The orthopedic cast material can be oriented by stretching it while it is warmed to a temperature below its melting point and cooling it while it is in its stretched condition. When in tubular shape the oriented material can be placed on a limb and heated whereupon the material shrinks into place about the limb. Of course, care must be taken that the tubular material is large enough and/or the extent of shrinkage is so controlled that circulation is not cut off. The oriented material, in tube, sheet or strip form, also can be placed over and shrunk on a previously hardened cast to give a neater, smoother surface, if desired.

The heat needed to raise the temperature of the cyclic ester polymer or blend in the cast material to render it deformable into a cast can be applied in any manner. The preferred manner is to use a thermostatically controlled heat gun or oven although in some cases an ordinary heated-air hair dryer can be used. The cast can be first heated and then put on, or first put on and then heated and held in place while it cools and sets.

The cyclic ester polymers melt at temperatures in the range of between 50°C. and 90°C. For example, poly-epsilon-caprolactone melts at about 55°C. to 60°C. The blends of the cyclic ester polymer and the poly(vinyl alkyl ether) melt at temperatures in the range of between 50°C. and 90°C. The blend of poly-epsilon-caprolactone and poly(vinyl ethyl ether) melts at about 30°C. to about 70°C. So the cast material can conveniently be heated to temperatures as low as 60°C. to 80°C., manually molded into the desired shape and cooled to set its shape. Of course, if a flexible base is used it should be chosen so that the flexible cast material can be melted without decomposing or damaging the flexible base. Of course, the most important consideration is the use of a flexible cast material that can be molded at a temperature which will not hurt or be uncomfortable to the skin. Also, the webs (sheets or strips) can be warmed to near the melting point and then cooled far below the melting point for patient comfort before being applied and the material retains enough ductility and formability to form a cast. The material normally sets in about 20 minutes or less when air cooled but will set within 5 minutes or less if contacted with cold water or other cold medium.

The following examples are presented, wherein, unless otherwise specified, all percentages and parts are by weight, all temperatures are on the Centigrade scale, all reduced viscosities are measured at a concentration of 0.2 gram of polymer in 100 milliliters of benzene at about 30°C. and Mylar designates poly(ethylene terephthalate).

EXAMPLE 1

A web of an 80/20 by weight blend of poly-epsilon-caprolactone (PCL) and poly(vinyl ethyl ether) was prepared using a two roll mill. The PCL had a reduced viscosity of about 3.23 in benzene at 30°C. and was prepared by dispersion polymerization in n-heptane using dibutylzinc catalyst and 5 percent vinyl chloride-lauryl methacrylate as interfacial agent. A portion of the web was press polished to give a film about 5 mils thick which was cut into strips about 2 inches wide. A broken pencil simulating a broken finger was wrapped with the resulting strip, which was warmed to about 60°C. to fuse the polymer blends, and allowed to cool to room temperature. The wrapped strips of web hardened on cooling because of the crystallization that took place in the poly-epsilon-caprolactone. The wrapped strips of web were easily molded to the contours of the pencil. The result was that the broken pencil was held as rigidly as a broken limb would be held in a conventional orthopedic cast.

EXAMPLE 2

Gauze bandage was wrapped about a human finger and then covered with the strips of the polished web made as described in Example 1. After this system was warmed and cooled as in Example 1, the finger was held as rigidly as it would be held by a conventional orthopedic cast. The material was closely molded to the contours of the finger, and the resulting cast was moisture and vapor permeable.

EXAMPLE 3

A 5 percent by weight solution of high molecular weight poly-epsilon-caprolactone, of the type described in Example 1 above, in methylene chloride was prepared by gently warming and agitating the components. After solution was effected, a 2-inch wide strip of Red Cross Regular gauze bandage (Johnson and Johnson) about 2 yards long was immersed in the solution. After 5 minutes immersion time, the strip was removed from the solution, drawn over a metal rod to remove excess solution, and air dried to remove the methylene chloride. The polymer represented 48 percent of the weight of the final product. The composite prepared in this manner was wrapped about a pencil and also a human finger, warmed to about 60°C. in each case to fuse the poly-epsilon-caprolacetone, and then cooled in each case. Hard or rigid orthopedic casts were formed in each case, and the casts were moisture and vapor permeable.

EXAMPLE 4

Example 3 was repeated, except that the methylene chloride solution contained four percent poly-epsilon-caprolactone and one percent poly(vinyl ethyl ether), i.e., an 80/20 by weight poly-epsilon-caprolactone/poly(vinyl ethyl ether) blend remained after the methylene chloride was evaporated. The polymer blend represented 44 percent of the weight of the final product. Hard or rigid orthopedic casts were formed in each case in the same manner as Example 3 and the resulting casts were moisture and vapor permeable.

EXAMPLE 5

Red Cross Regular gauze bandage was dusted with high molecular weight, fine particle size (dispersion prepared) poly-epsilon-caprolactone as described in Example 1 and warmed to 60°C. to fuse the polymer to the gauze substrate. The resulting material contained about 25 percent of the polymer based on the weight of gauze and polymer and was wrapped about a broken finger, heat fused at about 60°C., and cooled to room temperature to form a rigid cast that was moisture and vapor permeable. The amount of polymer added to the gauze could be varied by dusting the composite a number of times if desired, i.e., increased coat-weights of polymer can be applied to provide desired end-use properties, such as, reduced moisture and vapor permeability and increased rigidity, strength and toughness.

EXAMPLE 6

High molecular weight poly-epsilon-caprolactone of the type described in Example 1 above was press polished into a sheet 10 × 10 × ⅛ inch. A small rectangular strip of sheet was warmed to 60°C., bent lengthwise over the end of a finger, molded to the fingers contours and allowed to cool to room temperature. The result was a protective guard that protects an injured finger from bumps, and the like that would cause discomfort or further damage.

Additional strips were similarly shaped to produce preformed splints which need only be warmed, placed on the finger and subjected to a minimum amount of molding to form a splint on cooling.

EXAMPLE 7

Two larger rectangular strips of the press polished sheet of Example 6 were prepared and warmed to 60°C. One was folded lengthwise over the end of a thumb and was molded around the thumb. The other one was folded lengthwise over the end of an index finger and was molded around the index finger. The folded and molded strips were allowed to cool to room temperature. Hard and rigid casts were thus formed.

Additional strips were similarly shaped to produce preformed splints which need only be warmed, placed on the finger and subjected to a minimum amount of molding to form a splint on cooling.

EXAMPLE 8

The poly-epsilon-caprolactone used in this Example had a reduced viscosity of 3.2 dl/gm when determined in benzene at 30°C. and was formed using dibutyl zinc as the polymerization catalyst. The poly-epsilon-caprolactone was pressed polished into 8 × 8 × ⅛ inch plaques (A) and into 10 × 10 × 1/16 inch plaques (B). Three of the 8 × 8 inch plaques (A) were joined together by notching the ends and heat fusing the ends to form a sheet (C) about 24 × 8 × ⅛ inch which was perforated with ⅜ inch holes on 1 in. centers.

To produce the flannel faced material, a plaque (B) of poly-epsilon-caprolactone was placed on a chrome plate and covered with the flannel which was in turn covered with cellophane and a second chrome plate. The composite was then heated in a press to 60°C to 80°C. and pressed under line air pressure of about 80 p.s.i. The resulting composite was cooled and the cellophane removed. The result was a cotton flannel-faced sheet (D) of poly-epsilon-caprolactone.

To produce a flannel-reinforced sheet (E) from plaque (B) the above procedure was followed, but more than line pressure was applied. The flannel was embedded into the sheet, becoming an integral part of the sheet and was more like a reinforcing material than a facing material.

Several of the plaques (A) and (B) were perforated with 1/4 in. holes on 1 in. centers to produce perforated sheets (F) that allow air to reach the skin of the body portion covered by it.

Each of the plaques (A) and (B), the sheet (C) and the sheets (D), (E) and (F) were warmed to about 60°C., wrapped around and molded to the contours of a leg and allowed to cool to room temperature. The resulting splints were hard, rigid and non-irritating. The flannel-faced splints (D) and the perforated splints (F) were air and moisture permeable. All of the splints were easily removable by simply warming them to about 60°C. and manually deforming them from the leg.

EXAMPLE 9

High molecular weight poly-epsilon-caprolactone of the type described in Example 1 above was press polished into a sheet 10 × 10 × 1/16 inch and a sheet 10 × 10 × ⅛ inch. The first sheet was cut into a smaller piece, warmed to about 60°C., placed on a finger and cooled to make a finger splint cast. The second sheet was warmed to about 60°C., wrapped around an ankle and cooled to make an ankle brace.

The press polished sheets can be laminated on both faces by heat and pressure with stretchable films, such as, extremely thin Mylar. The resulting laminate can be warmed in small pans of hot water without sticking to the bottom or sides of the pan and without forming wrinkles, folds and pleats which cannot be flattened out.

In addition the ⅛ inch thick sheet was cut to size, warmed to about 60°C., wrapped around a wrist and cooled to form a rigid, contour-fitting splint. Also, the ⅛inch thick sheet can be perforated with holes comprising up to 50 percent of its surface area. The holes can be as large as dime-size or larger for the purpose of permitting inspection of the skin covered by the splint as well as permitting access of air to the skin and permeation of moisture from the skin.

EXAMPLE 10

One of the press polished sheets of Example 6 was cut into a strip and formed into a tube by heat fusing the ends together. The tube was of such a diameter that it could be easily and snugly fit on a finger. The tube was heated, placed on a finger and cooled to form a rigid, orthopedic cast.

EXAMPLE 11

Example 10 was repeated, except that the tube was placed on the finger, and then heated and cooled to form a rigid, orthopedic cast.

EXAMPLE 12

Example 8 is repeated, except that the poly-epsilon-caprolactone contained 25 percent calcium carbonate as a filler based on the total weight of polymer and filler. The resulting splints have the same properties as listed in Example 8 but are white in color.

What is claimed is:

1. Method of forming a cast on a portion of the human or animal body comprising the steps of
   a. applying to said body portion an orthopedic cast material in sheet form comprising a solid crystalline cyclic ester polymer having a reduced viscosity of about 0.3 to about 15 and having at least a major amount of recurring structural units of the formula:

(I) 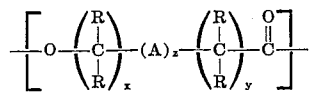

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x + y + z$ is at least 4 and not greater than 7, and (b) the total number of R variables which are substituents other than hydrogen does not exceed 3; and up to a minor molar amount of recurring structural units of the formula:

(II) 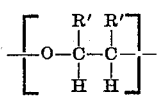

wherein each R' is selected from the class consisting of, individually, hydrogen, alkyl, cycloalkyl, aryl, and chloro-alkyl, and, together with the ethylene moiety of the oxy-ethylene chain of Unit II, a saturated cycloaliphatic hydrocarbon ring having four to eight carbon atoms, b. molding said cast material, at a temperature at which said cast material is soft enough to be deformed, into a shape substantially conforming to the contours of said body portion; and c. cooling said cast material to ambient temperature to rigidify said cast material in said molded shape.

2. Method as claimed in claim 1 wherein said cast material is warmed to the temperature at which it is soft enough to deform prior to applying it to said body portion.

3. Method as claimed in claim 1 wherein said cast material is warmed to the temperature at which it is soft enough to deform after it has been applied to said body portion.

4. Method as claimed in claim 1 wherein said cyclic ester polymer is blended with up to 90 percent of a poly(vinyl alkyl ether) based on the combined weight of cyclic ester polymer and poly(vinyl alkyl ether).

5. Method as claimed in claim 4 wherein said poly(vinyl alkyl ether) is poly(vinyl ethyl ether).

6. Method as claimed in claim 1 wherein said cyclic ester polymer is substantially a homopolymer of epsilon-caprolactone.

7. Method as claimed in claim 1 wherein said cast material is a sheet comprised essentially of a blend of said cyclic ester polymer and up to 90 percent of a poly(vinyl alkyl ether) based on the combined weight of said cyclic ester polymer and said poly(vinyl alkyl ether).

8. Method as claimed in claim 1 wherein said cast material further comprises cotton gauze impregnated with said cyclic ester polymer.

9. Method as claimed in claim 1 wherein said cast material further comprises cotton gauze impregnated with a blend of said cyclic ester polymer and up to 90 percent of a poly(vinyl alkyl ether) based on the combined weight of said cyclic ester polymer and said poly(vinyl alkyl ether).

10. Method as claimed in claim 1 wherein said cast material further comprises a composite having a sheet comprised essentially of said cyclic ester polymer bonded to a flexible base sheet.

11. Method as claimed in claim 10 wherein said thin flexible base sheet is cotton flannel.

12. Method as claimed in claim 10 wherein said thin flexible base sheet is Mylar film.

13. Method as claimed in claim 10 wherein said flexible base sheet is cotton gauze and said cast material is formed by dusting on said gauze small particles of said cyclic ester polymer and wherein said cyclic ester polymer is adhered to said gauze by heat fusing said particles to said gauze and cooling said gauze and the resulting fused particles.

14. Method as claimed in claim 10 wherein said flexible base sheet is cotton gauze and said cast material is formed by impregnating said gauze with a solution of said cyclic ester polymer and said cyclic ester polymer is adhered to said gauze by drying the impregnated gauze.

15. Method as claimed in claim 10 wherein said cyclic ester polymer is in sheet form and is bonded to said base sheet by heat and pressure.

16. Method as claimed in claim 15 wherein said cast material is a laminate comprising said cyclic ester polymer sheet as a substantially discrete layer bonded to said base sheet as another substantially discrete layer.

17. Method as claimed in claim 10 wherein said base sheet is permeable, and said cyclic ester polymer permeates said base sheet, said base sheet acting as a reinforcing filler in said cyclic ester polymer sheet.

18. Method as claimed in claim 1 wherein said temperature at which said cast material is warmed is about 30° to about 70°C.

19. Orthopedic cast for use on a portion of the human or animal body comprising a cast material shaped to the contours of said body portion, said cast material comprising a solid crystalline cyclic ester polymer having a reduced viscosity of about 0.3 to about 15 and having at least a major molar amount of recurring units of the formula:

(I) 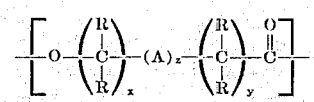

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x + y + z$ is at least 4 and not greater than 7, and (b) the total number of R variables which are substituents other than hydrogen does not exceed 3, and 0 to a minor molar amount of recurring units of the formula:

(II) 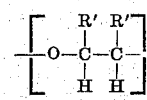

wherein each R' is selected from the class consisting of, individually, hydrogen, alkyl, cycloalkyl, aryl, and chloroalkyl and, together with the ethylene moiety of the oxyethylene chain of Unit II, a saturated cycloaliphatic hydrocarbon ring having from 4 to 8 carbon atoms.

20. Orthopedic cast as claimed in claim 19 wherein said cyclic ester polymer is blended with up to 90 percent of a poly(vinyl alkyl ether) based on the combined weight of cyclic ester polymer and poly(vinyl alkyl ether).

21. Orthopedic cast as claimed in claim 20 wherein said poly(vinyl alkyl ether) is poly(vinyl ethyl ether).

22. Orthopedic cast as claimed in claim 19 wherein said cyclic ester polymer is substantially a homopolymer of epsilon-caprolactone.

23. Orthopedic cast as claimed in claim 19 wherein said cast material is a sheet comprised essentially of a blend of said cyclic ester polymer and up to 90 percent of a poly(vinyl alkyl ether) based on the combined weight of said cyclic ester polymer and said poly(vinyl alkyl ether).

24. Orthopedic cast as claimed in claim 19 wherein said cast material comprises a composite having a sheet comprised essentially of said cyclic ester polymer bonded to a thin flexible base sheet.

25. Orthopedic cast as claimed in claim 24 wherein said thin flexible base sheet is cotton flannel.

26. Orthopedic cast as claimed in claim 24 wherein said thin flexible base sheet is Mylar film.

27. Orthopedic cast as claimed in claim 19 wherein said cast material comprises cotton gauze impregnated with said cyclic ester polymer.

28. Orthopedic cast as claimed in claim 19 wherein said cast material comprises cotton gauze impregnated with a blend of said cyclic ester polymer and up to 90 percent of a poly(vinyl alkyl ether) based on the combined weight of said cyclic ester polymer and said poly(vinyl alkyl ether).

29. Orthopedic cast as claimed in claim 19 wherein said cast material is perforated.

30. Orthopedic cast material comprising a composite having a sheet comprised essentially of a solid crystalline cyclic ester polymer having a reduced viscosity of about 0.3 to about 15 and having at least a major amount of recurring structural units of the formula:

(I) 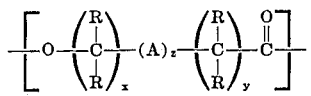

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x + y + z$ is at least 4 and not greater than 7, and (b) the total number of R variables which are substituents other than hydrogen does not exceed 3; and up to a minor molar amount of recurring structural units of the formula:

(II) 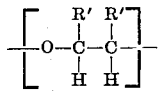

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having 4 to 8 carbon atoms; and a flexible base sheet to which said first sheet is bonded.

31. Orthopedic cast material as claimed in claim 30 wherein said flexible base sheet is cotton gauze impregnated with said cyclic ester polymer.

32. Orthopedic cast material as claimed in claim 30 wherein said flexible base sheet is cotton flannel as a substantially discrete layer bonded to said cyclic ester polymer sheet as another substantially discrete layer.

33. Orthopedic cast material as claimed in claim 30 wherein said base sheet is cotton flannel and said cyclic ester polymer permeates said base sheet which acts as a reinforcing filler in said cyclic ester polymer sheet.

34. Orthopedic cast material as claimed in claim 30 wherein said cyclic ester polymer is blended with up to 90 percent of a poly(vinyl alkyl ether) based on the combined weight of cyclic ester polymer and poly(vinyl alkyl ether).

35. Orthopedic cast as claimed in claim 19 wherein said cast material contains up to about 25 percent by weight of asbestos.

36. Method as claimed in claim 10 wherein said flexible base sheet is cotton gauze and said cast material is formed by dusting on said gauze small particles of a blend of said cyclic ester polymer and poly(vinyl alkyl ether) and wherein said blend is adhered to said gauze by heat fusing said particles to said gauze and cooling said gauze and the resulting fused particles.

37. Method as claimed in claim 10 wherein said flexible base sheet is cotton gauze and said cast material is formed by impregnating said gauze with a solution of a blend of said cyclic ester polymer and said poly(vinyl alkyl ether), and blend is adhered to said gauze by drying the impregnated gauze.

* * * * *